Figure 1:
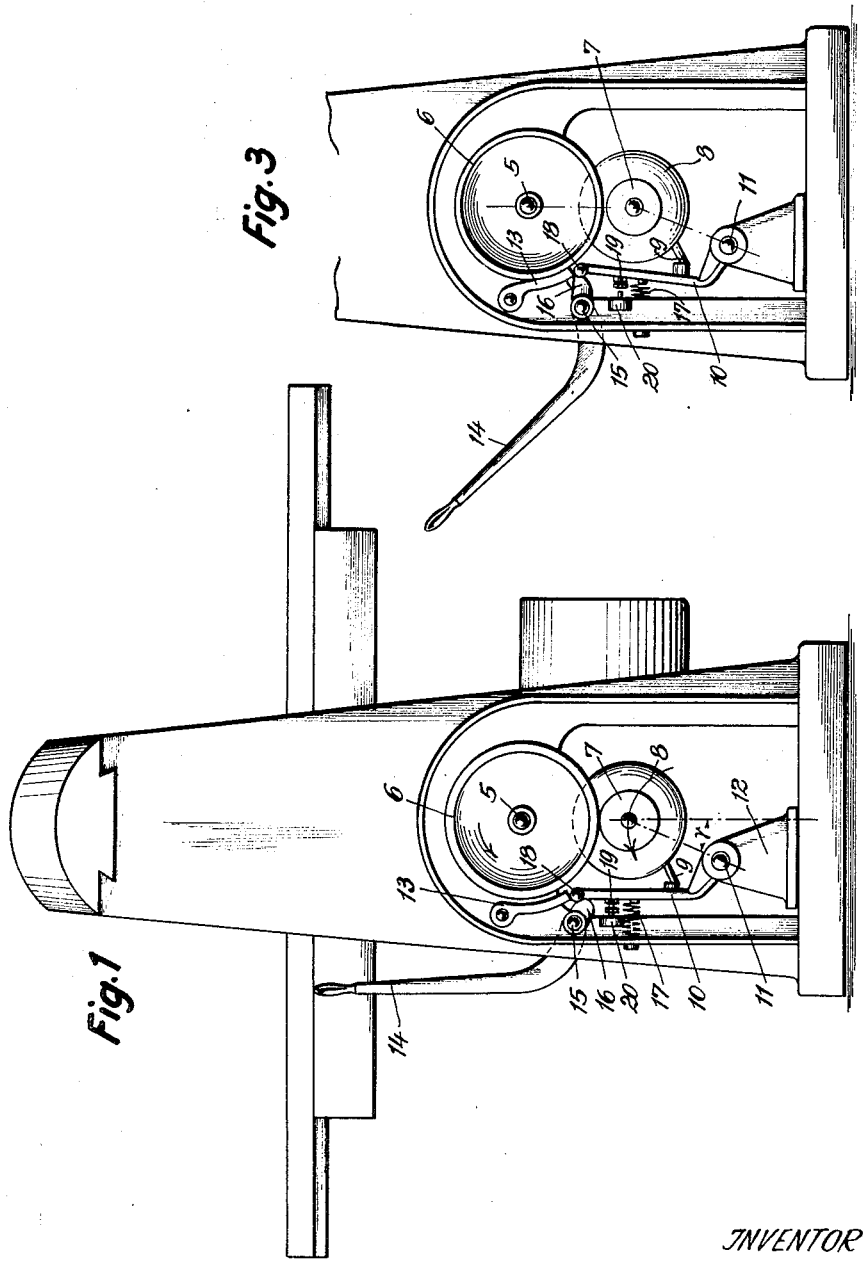

Dec. 21, 1954 F. KLOPP 2,697,500
MACHINE TOOL WITH AN INDIVIDUAL ELECTRIC MOTOR DRIVE
Filed June 12, 1951 5 Sheets-Sheet 1

INVENTOR
Friedrich Klopp
BY Harness, Dickey & Pierce
ATTORNEYS

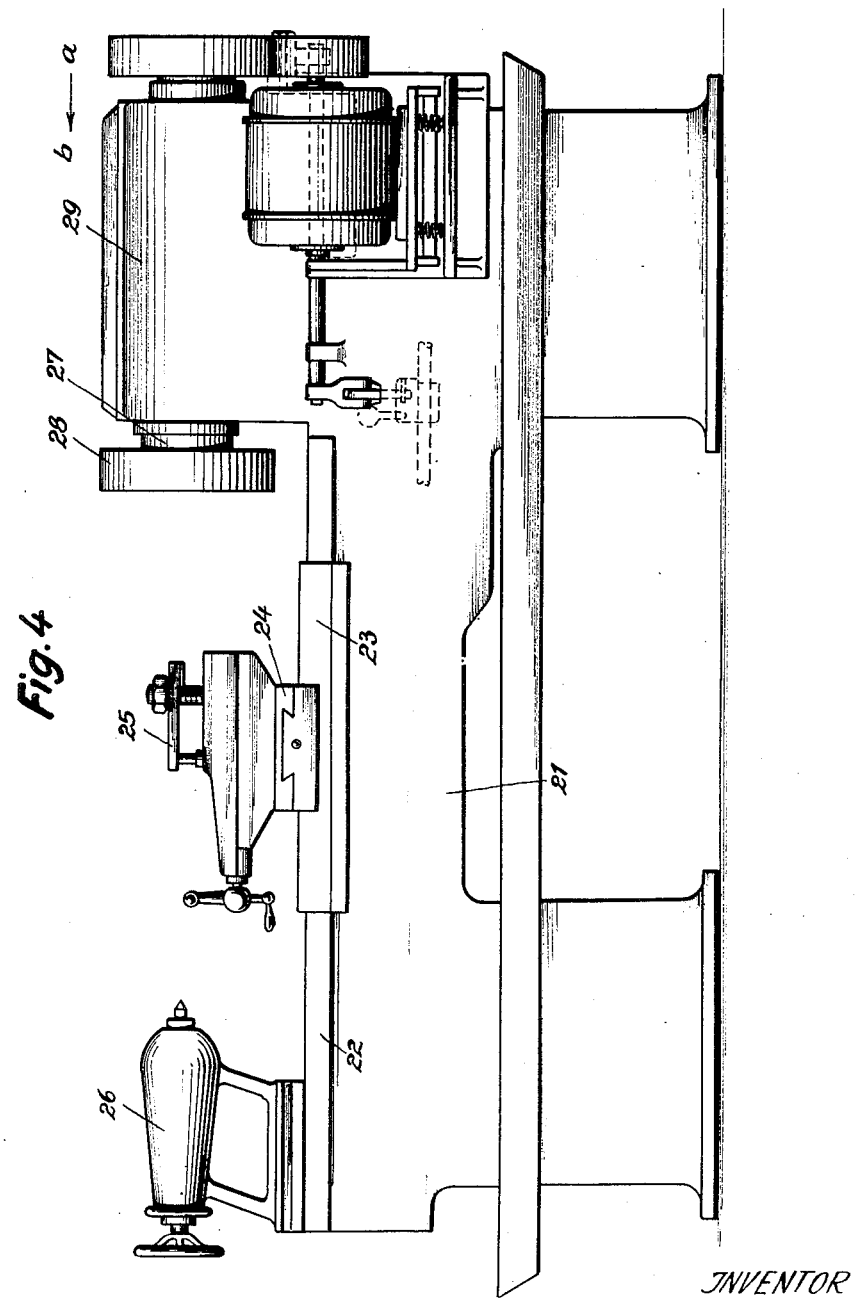

Dec. 21, 1954          F. KLOPP          2,697,500
MACHINE TOOL WITH AN INDIVIDUAL ELECTRIC MOTOR DRIVE
Filed June 12, 1951          5 Sheets-Sheet 4
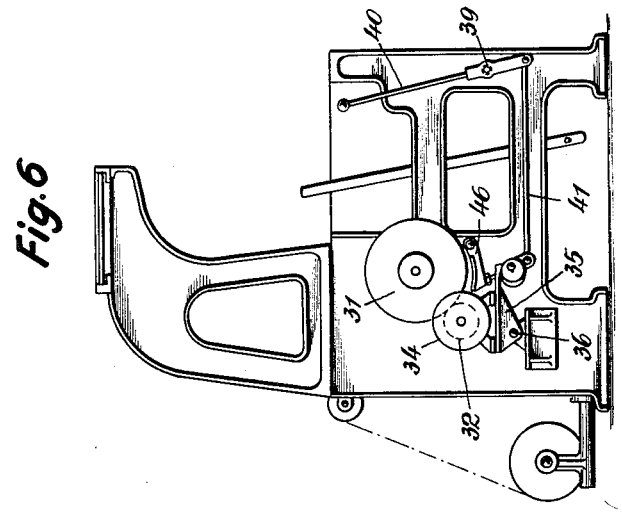
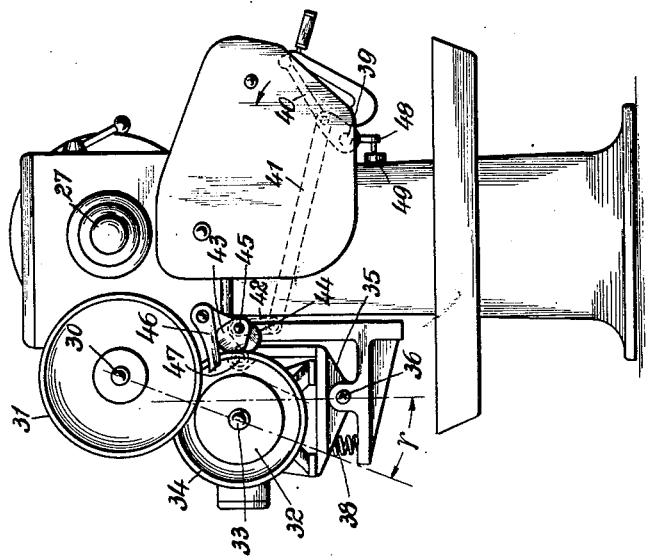
INVENTOR
Friedrich Klopp
BY Harness, Dickey & Pierce
ATTORNEYS Dec. 21, 1954  F. KLOPP  2,697,500
MACHINE TOOL WITH AN INDIVIDUAL ELECTRIC MOTOR DRIVE
Filed June 12, 1951  5 Sheets-Sheet 5

INVENTOR
Friedrich Klopp

BY Harness, Dickey & Pierce
ATTORNEYS

United States Patent Office 2,697,500
Patented Dec. 21, 1954

2,697,500

MACHINE TOOL WITH AN INDIVIDUAL ELECTRIC MOTOR DRIVE

Friedrich Klopp, Solingen-Wald, Germany

Application June 12, 1951, Serial No. 231,180

Claims priority, application Germany June 20, 1950

6 Claims. (Cl. 192—4)

This invention relates to a machine tool with an individual electric motor drive and mechanical power transmission to the part of the machine causing the working movement and comprises an improvement in and further development of the invention claimed in the co-pending U. S. application of the invention filed on March 13, 1950 under Serial No. 153,073.

This prior application relates to a high-speed planing machine in which the part of the machine tool causing the working movement is formed as a ram to which the tool is fixed in known manner. According to this application a friction wheel drive having a movably-mounted driving wheel is provided between the driving motor and the ram, the driving wheel by means of a lever (control lever) by which a brake is also operated through which the part of the machine connected with the driven wheel of the friction wheel drive may be braked in dependence upon the disengagement of the driving wheel.

This feature is according to the invention in general also applicable to other machine tools, thereby providing the same or similar advantages as in the prior application.

The friction wheel drive constructed according to the prior application is not only applicable to machine tools for effecting planing operations on metal but is also applicable with advantage to machines operating on timber. It has been proved that it is advantageous in other machine tools, to employ not only the inventive feature of claim 1 of the prior application but also the improvements and further developments of the subordinate claims of this prior application. In particular it is in general advisable to secure the driving wheel of the friction wheel drive to the armature shaft of the movably-mounted electric motor. In addition it is in general also advantageous in other machine tools to cause the control lever by means of a cam or eccentric to operate on the movable mounting of the electric motor as well as on the brake.

Preferably the drive of the electric motor is likewise interrupted in dependence upon the interruption of the driving connection between it and the machine tool. Hence it is advisable that the control lever also effects the connection and disconnection of the electric motor.

It has further been proved that the friction wheel drive constructed in this manner can be used not only for machine tools generally in the special sense but also with advantage for other processing machines. As examples may be particularly mentioned here looms, paper-making machines and milling machines.

Figure 2:
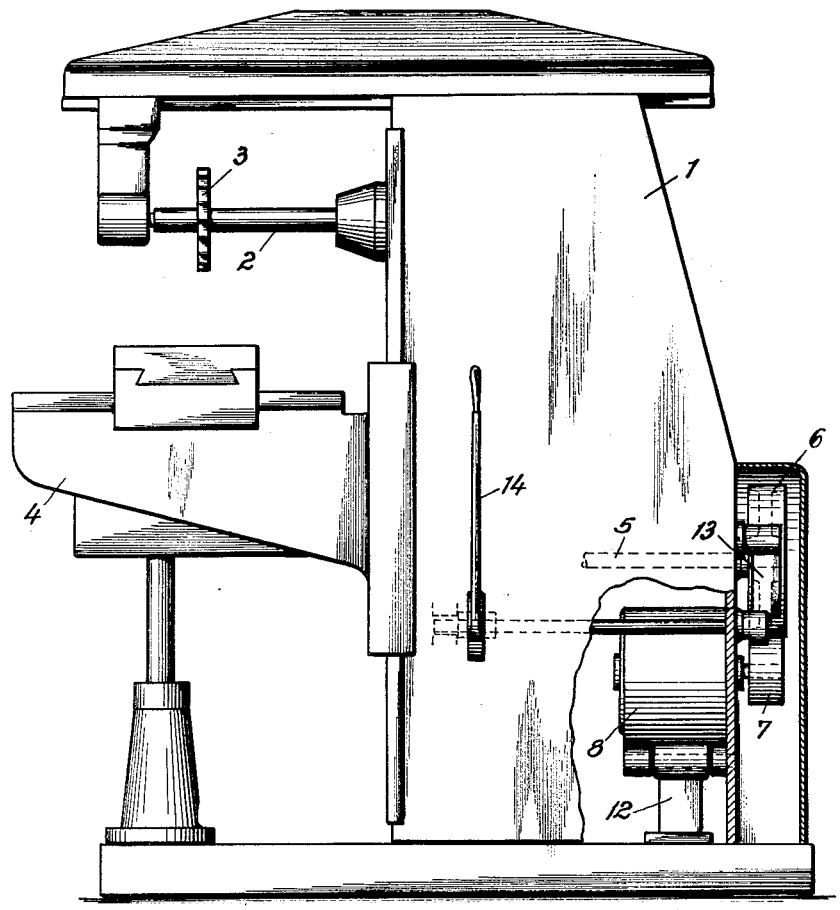
Figure 7:
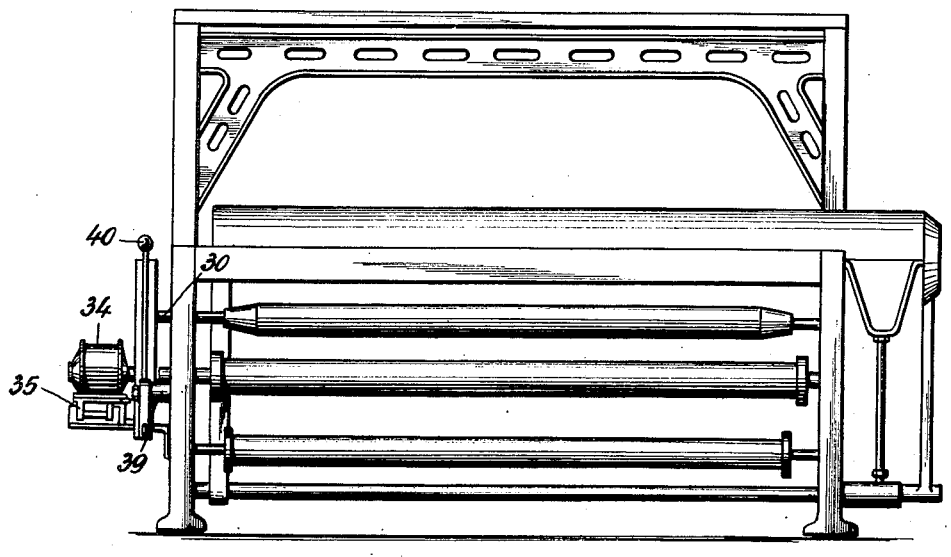

The accompanying drawings show, by way of example, one embodiment of the invention. In the drawings:

Fig. 1 shows a view of the driving side of a milling machine constructed according to the invention, in the engaged position, Fig. 2 shows a side view of this milling machine, Fig. 3 shows a view similar to Fig. 1 of this milling machine in the disengaged position, Fig. 4 shows a rear view of a lathe constructed according to the invention, Fig. 5 shows a view of the driving side of this lathe looking in the direction a—b of Fig. 4, Fig. 6 shows an end view of a loom having a friction wheel drive according to the invention and Fig. 7 shows a front view of this machine.

The milling machine of Figs. 1 to 3 comprises, as is well known, a support 1 in which a milling spindle 2 carrying a cutter 3 is mounted, and a work table 4. The drive to the milling spindle 2 is obtained in known manner from a shaft 5 and the driving means between the shaft 5 and the milling spindle 2 being known is not shown in detail.

On the shaft 5 a driving disc 6, for example, of cast iron, is fixed against which in a manner described in detail subsequently a friction wheel 7 is urged, the friction wheel being secured to the armature spindle of a motor 8. This motor 8 is in its turn arranged with its mounting base 9 on a lever 10 which is rotatably mounted on a shaft 11 which is carried by a pedestal bearing 12. This pedestal bearing is secured in any known manner to the machine support 1.

A brake block 13 serves to brake the driving wheel 6, the brake block being likewise rotatably mounted on the machine support 1 and is operated in a manner to be described later.

A manually-operated lever 14 is employed for engaging and disengaging the machine, the lever rotating a cam 16 by means of a shaft 15 mounted on the machine frame. The cam 15 engages with the lever 10, which is controlled by a draw spring 17, through a roller 18 rotatably mounted on this lever. In addition the machine switch 20 for connecting and disconnecting the electric motor 8 is fixed to the machine support 1, the switch being operated by the lever 10 through an adjusting screw 19.

The angle $\gamma$ is in known manner made, equal to or greater than the friction angle of the friction coefficient $\mu$ between the friction wheel 7 and the driving disc 6.

The friction disc drive is shown in Fig. 1 in the engaged position. The machine switch 20 is closed due to the operation of the adjusting screw 19 by the lever 10. The motor 8 runs and drives the friction wheel 7 which in its turn drives the driving disc 6 through frictional engagement with automatic adjustment of the engaging pressure to the torque to be transmitted so that the milling spindle 2 together with the cutter 3 is rotated at the desired speed. The directions of rotation of the driving disc 6 and the friction wheel 7 are indicated by arrows in Fig. 1. A further arrow in Fig. 1 shows the direction of the curve in which with increasing loading the friction wheel 7 swings about the axis of the shaft 11 into engagement with the driving disc 6. The lining (not shown) of the brake block 13 is out of engagement since the brake block has moved out of engagement under the action of its own weight. The draw spring 17 provides the necessary engaging pressure during running.

To disengage the machine, the lever 14 is moved downwards as shown in Fig. 3. Now the cam 16 so operates on the lever 10 through the roller 18 that the friction wheel 7 is disengaged from the driving disc 6. Substantially simultaneously the lever 10 releases the adjusting screw 19 so that the machine switch is opened and the electric motor is disconnected from the supply. Substantially simultaneously with the disengagement of the friction wheel 7, the brake block 13 is applied by the same cam 16 whereby the driving disc 6 together with the drive and the milling spindle 2 together with the cutter 3 are brought to rest.

To engage the machine, the lever is moved back to the position shown in Fig. 1. It will be noted from a comparison of Figures 1 and 3 that due to the coaction of cam 16 and roller 18 the lever 14 is positively held in either of its positions. Since the action of spring 17 continually urges the lever 10 to the left, roller 18 will engage the underside of cam 16 to hold lever 14 in the disengaged position of Figure 3. When lever 14 is lifted into the position of Figure 1, spring 17 will rock the motor assembly counterclockwise, and the friction wheels will be positively engaged independently of manual pressure on lever 14, due to the action of spring 17 and the relation of angle $\gamma$ to the friction angle. Furthermore, lever 14 will be held in its new position since roller 18 is now disposed above cam 16.

The lathe shown in Figs. 4 and 5 consists in known manner of a bed 21 with guide rails 22 on which are arranged for longitudinal movement a longitudinal guide 23 and a transverse guide 24 provided with a tool holder 25. In addition the machine is provided in known manner with a handstock 26 having a centre pin and a work spindle 27 with a lathe chuck 28 and a spindle box 29 in which is located the gears for driving the work spindle.

The shaft for driving these gears is indicated at 30 and carries a driving disc 31 with which, while the machine is being driven, a friction disc 32 engages, the friction disc being fixed to the armature shaft 33 of an electric motor 34. The electric motor is positional on a support 35 which is rotatably secured by a pin 36 to a bracket 37 of the lathe bed. By means of a spring 38, of which one end engages with the bracket 37 and the other with the support 35, the friction disc 32 is urged against the circumference of the driving disc 31.

The angle γ is again equal to or greater than the angle of friction of the friction coefficient between the friction wheel 32 and the driving disc 31. A lever 40 is rotatable on a shaft 39 mounted on the base, the lever preventing movement of two cams 43 and 44 by means of the push rod 41 and lever 42. The cams 43 and 44 are secured to a shaft 45 rotatably mounted on the frame of the machine. Further a brake block 46 is rotatably mounted on this frame, the brake block being prevented from engaging with the driving disc 31 as it moves out of engagement with this disc under its own weight. While the cam 43 serves to control the brake block 46, the cam 44 cooperates with a roller 47 which is rotatably mounted on an arm of the support 35. In addition, the switch pin 48 of a machine switch 49, which is provided on the machine frame, is operated by the lever 40.

The friction wheel drive for this lathe operates in a similar manner as that described for the milling machine. Fig. 5 shows the drive in the engaged position. The electric motor 34 is energized by the machine switch 49 through the switch spindle 48. The friction wheel 32 is rotated and through frictional engagement drives the driving disc 31 and hence the lathe shaft 27, the pressure of engagement being automatically accommodated to the actual torque to be transmitted. The brake block 46 has moved under its own weight out of engagement with the driving disc 31.

To disengage the machine, the lever 40 is moved in a clockwise direction looking at Fig. 5 whereby the cam 44 is rotated so that through engagement of the roller 47, the support 35 is moved against the tension of the spring 38 out of engagement with the driving disc 31. Approximately at the same time the cam 43 is so rotated that the brake block 46 is actuated and the shaft 27 thereby brought to rest. The lever 40 releases the switch pin 48 so that the machine switch 49 disconnects the motor from the supply. It will be noted that the lever 40 and the drive mechanism will be positively held in either of their positions by the coaction of cam 44 and roller 47, which produce an action similar to that described with respect to roller 18 and cam 16 in the embodiment of Figures 1 to 3.

The loom shown in Figs. 6 and 7 can be of any type. The type of friction wheel drive used therein differs so slightly from the type of friction wheel drive, which has been described with reference to Figs. 1–5, that for clarifying Figs. 6 and 7 the same reference numbers have been used as in Figs. 4 and 5.

Having now particularly described and ascertained the nature of my said invention and in what manner the same is to be performed, I declare that what I claim is:

1. In a machine tool for working wood, metal or the like an electric-motor for driving a rotatable shaft bearing a friction wheel, a frame member for movably supporting the motor casing, a further friction wheel in the plane of said first wheel and being operatively connected with such tool by mechanical means, resilient means for urging such driving friction wheel into circumferential engagement with such further friction wheel, a brake mechanism for stopping the movement of such further friction wheel, a common control member movable to one position for bringing into engagement such braking mechanism with such further friction wheel and for bringing out of engagement such driving friction wheel against the action of such resilient means substantially at the same time, said control member being movable to another position for simultaneously permitting disengagement of said braking mechanism and engaging said friction wheels, and means for holding said control member in either of its said positions independently of manual pressure.

2. In a machine tool according to claim 1, cam means operatively connected with said common control means and adapted to be engaged and disengaged with the braking mechanism and with the member for supporting the motor casing.

3. In a machine tool according to claim 1, an electric switch for controlling the flow of electric current to the motor, said switch being operated by said common control member.

4. In a machine tool for working wood, metal or the like, an electric motor, a rotatable shaft bearing a driving friction wheel and driven by said motor, a frame member for movably supporting the motor casing, a further friction wheel in the plane of said first wheel and being operatively connected with such tool by mechanical means, resilient means for continually urging such driving friction wheel in circumferential engagement with such further friction wheel, a brake mechanism for stopping the movement of such further friction wheel, a cam follower connected to said frame member, and a common control member including a manually actuated cam engageable with said cam follower and said brake mechanism, said cam being movable between a first position in which said friction wheels are engaged and said brake machanism is simultaneously released, and a second position in which the brake mechanism is engaged and the friction wheels simultaneously disengaged, said resilient means urging said cam follower against said cam to hold said cam in either of its said positions independently of manual pressure.

5. In a machine tool for working wood, metal or the the like, an electric motor, a rotatable shaft bearing a driving friction wheel and driven by said motor, a frame member for rockably supporting the motor casing, a further friction wheel in the plane of said first wheel and being operatively connected with said tool by mechanical means, resilient means for urging said driving friction wheel in circumferential engagement with said further friction wheel, a brake for stopping the movement of said further friction wheel, said brake being pivotally mounted at a point spaced from said rockable frame member, a common control member movable between a first position for engaging said brake and simultaneously disengaging said friction wheels and a second position disengaging said brake and simultaneously engaging said friction wheels, and means for holding said common control member in either of its said positions independently of manual pressure.

6. The combination according to claim 5, further provided with a cam follower on said frame member, said common control member including a manually actuated cam engageable with said cam follower and said brake, said cam being movable between a first position in which said friction wheels are engaged and said brake is released, and a second position in which the brake is engaged and the friction wheels disengaged, said cam being simultaneously engageable with said cam follower and said brake when in its second position.

References Cited in the file of this patent

UNITED STATES PATENTS

| Number | Name | Date |
|---|---|---|
| 769,700 | Krawitzky | Sept. 13, 1904 |
| 957,223 | Lenhart | May 10, 1910 |
| 993,317 | Rockstroh | May 23, 1911 |
| 1,136,246 | Levin | Apr. 20, 1915 |
| 1,422,218 | Maimin | July 11, 1922 |
| 1,482,518 | Laserson | Feb. 5, 1924 |
| 2,200,175 | Kaestner | May 7, 1940 |
| 2,376,524 | Talboys | May 22, 1945 |